(12) United States Patent
Yoneda

(10) Patent No.: US 9,836,050 B2
(45) Date of Patent: Dec. 5, 2017

(54) GUIDED VEHICLE SYSTEM AND GUIDED VEHICLE CONTROL METHOD

(75) Inventor: Hisato Yoneda, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 463 days.

(21) Appl. No.: 14/124,624

(22) PCT Filed: Apr. 19, 2012

(86) PCT No.: PCT/JP2012/060553
§ 371 (c)(1),
(2), (4) Date: Dec. 6, 2013

(87) PCT Pub. No.: WO2013/005466
PCT Pub. Date: Jan. 10, 2013

(65) Prior Publication Data
US 2014/0100717 A1    Apr. 10, 2014

(30) Foreign Application Priority Data

Jul. 7, 2011 (JP) .................................. 2011-150796

(51) Int. Cl.
G05D 1/00    (2006.01)
G05D 1/02    (2006.01)

(52) U.S. Cl.
CPC ......... *G05D 1/0027* (2013.01); *G05D 1/0289* (2013.01); *G05D 1/0297* (2013.01); *G05D 2201/0216* (2013.01)

(58) Field of Classification Search
CPC .. G05D 1/0027; G05D 1/0287; G05D 1/0289; G05D 1/0291; G05D 1/0293; G05D 2201/0216
See application file for complete search history.

(56) References Cited

U.S. PATENT DOCUMENTS

2006/0271252 A1    11/2006    Hori et al. ............ 701/23
2010/0228389 A1    9/2010    Hayashi ................ 700/229

FOREIGN PATENT DOCUMENTS

JP    11-259131        9/1999
JP    2006-331053    12/2006
(Continued)

OTHER PUBLICATIONS

Japanese language international search report dated May 29, 2012 and its English language translation issued in corresponding PCT application PCT/JP2012/060553.

*Primary Examiner* — Mussa A Shaawat
*Assistant Examiner* — Kyung Kim
(74) *Attorney, Agent, or Firm* — DLA Piper LLP (US)

(57) ABSTRACT

In a guided vehicle system, articles are transported between load ports by a plurality of guided vehicles traveling with articles carried thereon along a predetermined traveling route. A guided vehicle system controller communicates with a superordinate controller and guided vehicles, and creates traveling schedules representing positions and times at which the guided vehicles travel, disregarding interferences with other guided vehicles. For both newly created traveling schedules and traveling schedules from which interferences have been eliminated, interferences between the guided vehicles are detected, and the traveling schedules of the guided vehicles is modified so as to eliminate the detected interferences. The traveling schedules from which interferences have been eliminated interferences is stored. Also, the positions of the guided vehicles are stored based on data received from the guided vehicles, and the traveling schedules is modified.

8 Claims, 8 Drawing Sheets

(56) References Cited

FOREIGN PATENT DOCUMENTS

| JP | 2010-205102 | 9/2010 |
| JP | 2010-262588 | 11/2010 |

F I G. 7
| VCP position | Time | Target velocity | Event |
|---|---|---|---|
| VCP1 | T1 | V1 | |
| VCP2 | T2 | 0 | Pickup |
| VCP3 | T3 | V3 | |
| VCP4 | T4 | V4 | Merging |
| VCP5 | T5 | V5 | |
| VCP6 | T6 | 0 | Drop off |
| VCP7 | T7 | V7 | Move to waiting position |
70
F I G. 8
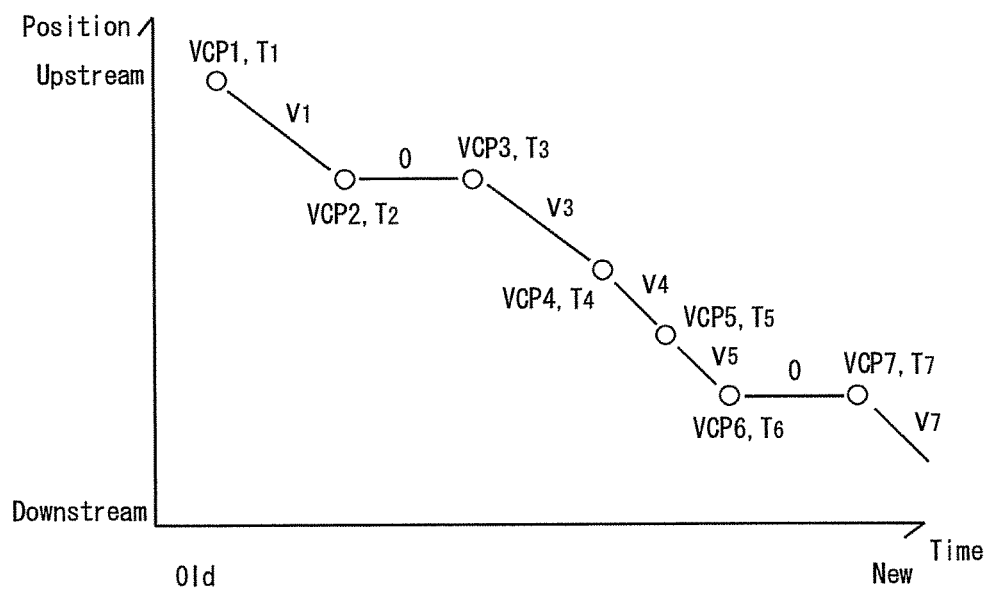

F I G. 9
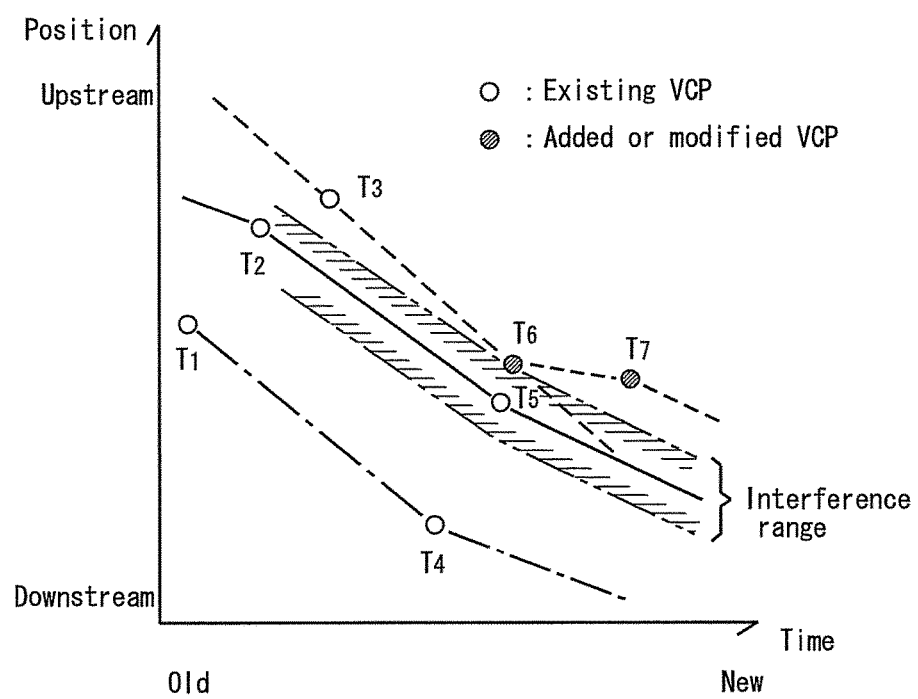

GUIDED VEHICLE SYSTEM AND GUIDED VEHICLE CONTROL METHOD

This application is a national stage of international application No. PCT/JP2012/060553, filed on Apr. 19, 2012, and claims the priority under 35 USC 119 of Japanese Patent Application No. 2011-150796, filed on Jul. 7, 2011, which are incorporated herein by reference.

BACKGROUND OF THE INVENTION

1. Field of the Invention

The present invention relates to a guided vehicle system that transports articles by traveling between load ports through auto-guiding.

2. Description of the Related Art

Guided vehicles, such as overhead traveling vehicles that travel along rails in the overhead space, rail guided vehicles that travel along rails in the space near the ground, and auto-guided vehicles that travel on the floor surface without rails, transport articles between load ports. Some of these guided vehicles are equipped with a transfer device, and some are not. The load ports are sometimes called "stations", and they may be provided, for example, at the end portion of a processing device, a stocker, an automated warehouse, or a conveyor. Articles may be temporarily placed in a buffer in the middle of transportation between the load ports.

Regarding a guided vehicle system, Patent Literature 1 (JP2006-331053) discloses that guided vehicles periodically transmit the current position and the reporting time to a controller on the ground, and the ground controller periodically carries out updating based on the transmitted data to obtain a distribution of the positions of the guided vehicles. Based on the distribution of the guided vehicles, the ground controller assigns a traveling route to each guided vehicle so as to avoid jamming. Each guided vehicle to which a traveling route has been assigned travels with a goal of arriving at the destination position ("To position") in the shortest possible time by traveling within the range of the velocity limit and so as to avoid interference with the preceding guided vehicle. However, it is difficult to precisely estimate what position each guided vehicle passes through at what time because this depends on the jamming status of the traveling route, for example. It is thus also difficult to estimate the time at which each guided vehicle arrives at the To position. In addition, the ground controller may roughly control the future traveling amount in each portion of the traveling route by assigning a traveling route to each guided vehicle. However, it is difficult to perform control as to what guided vehicle travels at what position on the traveling route at what time.

According to Patent Literature 2 (JP2010-205102), a ground controller regularly transmits position instructions to guided vehicles, and each of the guided vehicles travels by generating a velocity instruction and a torque instruction by itself according to the received position instruction. In the system of Patent Literature 2, the positions of the guided vehicle may be controlled by the ground controller, but it is necessary to generate the position instructions at a short time interval, resulting in a great burden on the ground controller and also a high communication load on the system.

CITATION LIST

Patent Literature

Patent Literature 1: JP 2006-331053
Patent Literature 2: JP 2010-205102

SUMMARY OF THE INVENTION

It is an object of the present invention to enable creation of a traveling schedule from which interference between guided vehicles has been eliminated and modification of the traveling schedule when it deviates from reality.

Preferred embodiments of the present invention provide a guided vehicle system for transporting articles between load ports by a plurality of guided vehicles traveling with articles carried thereon along a predetermined traveling route, the system including: a guided vehicle system controller comprising: a first communication unit configured to receive a transport request by communicating with a superordinate controller; a second communication unit configured to communicate with the guided vehicles; a schedule creating unit configured to create, for each of the guided vehicles, a traveling schedule, disregarding interference with another guided vehicle, the traveling schedule representing a position and a time at which the guided vehicle travels on the traveling route; an interference eliminating unit configured to, for both a newly created traveling schedule and a traveling schedule from which interference has been eliminated, detect interference between the guided vehicles, and modify the traveling schedule of the guided vehicle so as to eliminate the detected interference, a first storage unit configured to store the traveling schedule from which interference has been eliminated; and a second storage unit configured to store at least a position of each of the guided vehicles based on data received by the second communication unit from the guided vehicle, the guided vehicle system controller being configured to give an instruction to travel to the guided vehicles according to the traveling schedule from the second communication unit, and repeat the creation of the traveling schedule, the elimination of interference by modifying the traveling schedule, the storage of the traveling schedule from which interference has been eliminated in the first storage unit, and modification of the traveling schedule based on the data in the second storage unit.

Preferred embodiments of the present invention also provide a guided vehicle control method for controlling a guided vehicle in a system for transporting articles between load ports by a plurality of guided vehicles traveling with articles carried thereon along a predetermined traveling route, the method comprising performing with a guided vehicle system controller: a): a step for receiving a transport request from a superordinate controller; b): a step for creating a traveling schedule for each of the guided vehicles, disregarding interference with another guided vehicle, the traveling schedule representing a position and a time at which the guided vehicle travels on the traveling route; c): a step for detecting, for both a newly created traveling schedule and a traveling schedule from which interference has been eliminated, interference between the guided vehicles; d): a step for modifying the traveling schedule of the guided vehicle so as to eliminate the detected interference; e): a step for storing the traveling schedule from which interference has been eliminated; f): a step for storing at least a position of each of the guided vehicles based on data received from the guided vehicle; g): a step for modifying the traveling schedule based on the stored position of the guided vehicle; and h): a step for giving an instruction to travel to the guided vehicle according to the traveling schedule, the guided vehicle system controller being configured to execute the steps c) to g) a plurality of times from the start of a single run of the traveling schedule until the completion thereof.

Preferably, the step h) is repeated a plurality of times, but it may be performed only once per traveling schedule. The first communication unit and the second communication unit may be physically the same, and may be a LAN interface that is used in common, for example. Furthermore, the first communication unit and the second communication unit may communicate with the superordinate controller via an intermediate controller, rather than directly communicating with the superordinate controller. Alternatively, they may communicate with the guided vehicles via an intermediate zone controller or the like, rather than directly communicating with the guided vehicles. Moreover, the first storage unit (storage unit 31 in a preferred embodiment) and the second storage unit (state managing unit 34 in the preferred embodiment) may be physically the same. The instruction to the guided vehicles may be a traveling schedule, or an instruction obtained by further processing the traveling schedule, for example. The guided vehicle system controller may be physically a single controller, or may be a plurality of distributed controllers.

According to the present invention, the traveling schedules are created, disregarding interferences with other guided vehicles. Then, for the previously created traveling schedules from which interferences have been eliminated and newly created traveling schedules, interferences between the guided vehicles are detected. Upon detection of interferences, the traveling schedules of the guided vehicles are modified. Then, the traveling schedules from which interferences have been eliminated are stored, and the traveling schedules are modified based on the real positions of the guided vehicles. Furthermore, the creation of the traveling schedules, the elimination of interferences by modifying the traveling schedules, the storage of the traveling schedules from which interferences have been eliminated, and the modification of the traveling schedules based on the positions of the guided vehicles are repeated.

This makes it possible to continually create new traveling schedules, and eliminate interferences with the existing traveling schedules. Further, when the traveling schedules deviate from the actual positions of the guided vehicles, the traveling schedules may be modified so as to be made closer to reality. In the present specification, the descriptions related to the guided vehicle system also directly apply to the traveling schedule generation method. Conversely, the descriptions related to the traveling schedule generation method also directly apply to the guided vehicle system.

In the preferred embodiment, the traveling schedule is simplified as a string of velocity control points VCPs, thereby facilitating the detection of interference and the modification of the traveling schedule, but the present invention is not limited thereto. For example, the traveling schedule may be a string of times of passage through the points located between the starting point and the destination.

Preferably, the guided vehicle system controller further includes a schedule modifying unit. The schedule modifying unit compares the real states of guided vehicles stored in the second storage unit (state managing unit in the preferred embodiment) with the traveling schedules stored in the first storage unit, and modifies the traveling schedules in the first storage unit if there is a deviation greater than a permissible value. According to the modified traveling schedules, instructions to travel are given to the guided vehicles via the second communication unit.

Preferably, a plurality of exclusive control areas are provided along the traveling route, and the guided vehicle system controller further includes an arbitrator. The arbitrator determines the order in which the guided vehicles pass through the exclusive control areas based on requests from the guided vehicles or the data in the second storage unit.

Preferably, the schedule creating unit creates the traveling schedule from current positions of the guided vehicles via positions at which the guided vehicles pick up articles to waiting positions where the guided vehicles are waiting after dropping off the articles. By doing so, stopping of the guide vehicles at the drop-off positions and the transferring articles are included in a traveling schedule, and therefore, an interference with a following guided vehicle is eliminated.

Preferably, the guided vehicle system controller reports an estimated arrival times of the guided vehicles at the load ports based on the traveling schedules to the superordinate controller via the first communication unit. According to the present invention, reliable traveling schedules are obtained for the guided vehicles. If the traveling schedules deviate from reality, they are modified so as to conform to reality. Therefore, to make use of this, it is preferable to report the estimated arrival times to the superordinate controller. Particularly preferably, the transport request specifies a load port where an article is picked up and a load port where an article is dropped off, as well as a time at which drop-off becomes possible and a time at which drop-off should have been completed, and the schedule creating unit creates the traveling schedule such that the guided vehicle arrives at the load port where an article is dropped off between the time at which drop-off becomes possible and the time at which drop-off should have been completed. This may prevent the processing device from stopping.

BRIEF DESCRIPTION OF THE DRAWINGS

FIG. 7 shows an example of the traveling schedule according to the preferred embodiment.

FIG. 8 is a graph showing the traveling schedules in FIG. 7 as the positions of the guided vehicle and the time.

FIG. 9 is a graph illustrating the elimination of interference between traveling schedules according to the preferred embodiment.

DETAILED DESCRIPTION OF THE PREFERRED EMBODIMENTS

The following describes preferred embodiments of the present invention. The scope of the present invention is based on the claims, and is intended to be determined in accordance with the understanding of a person skilled in the art with reference to the description of the present invention and related art in the field of the present invention.

Figure 1:
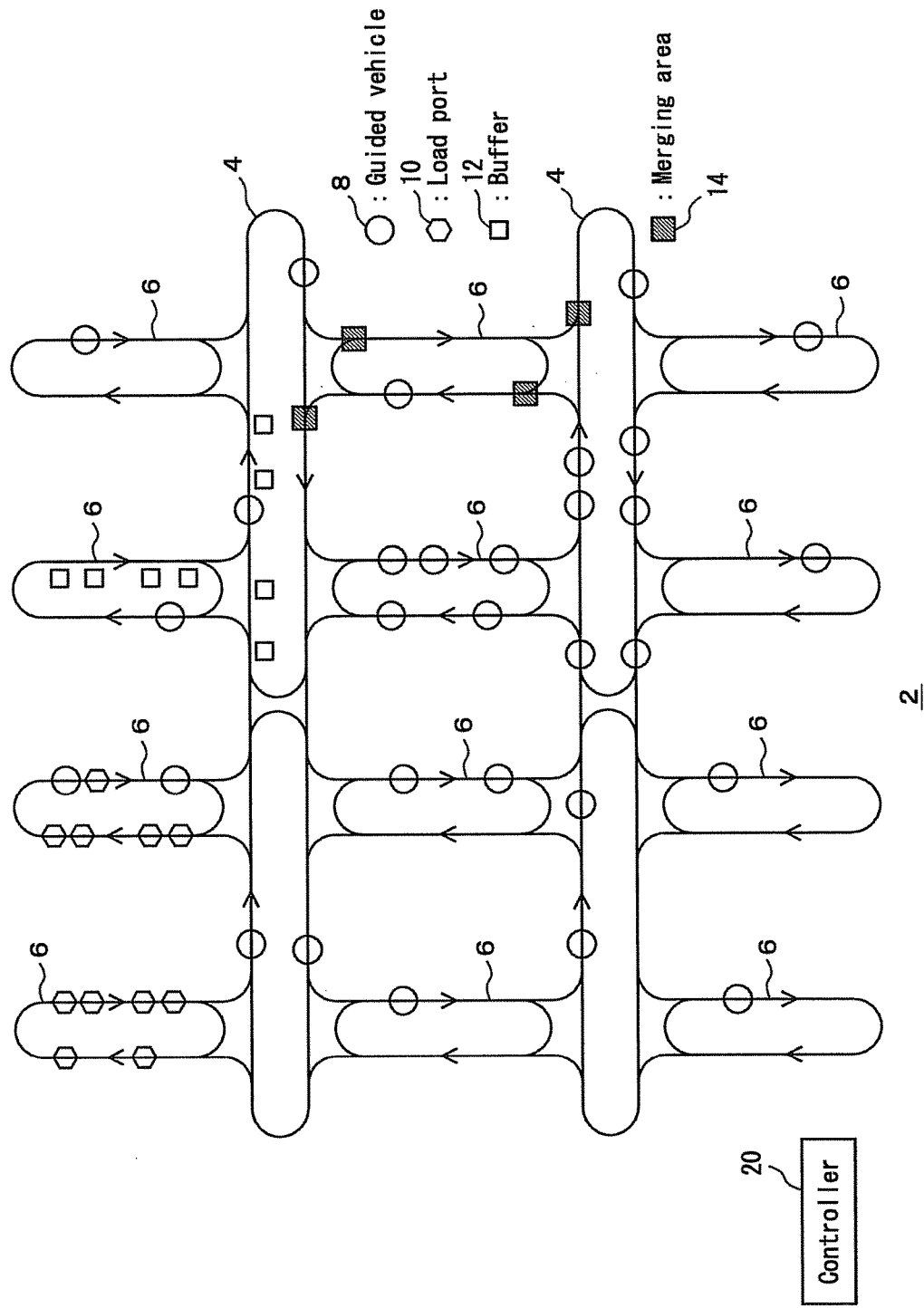
FIG. 1 shows a layout of a guided vehicle system according to a preferred embodiment.

FIGS. 1 to 10 show a guided vehicle system 2 according to a preferred embodiment. As shown in FIG. 1, the guided vehicle system 2 includes inter-bay routes 4 and intra-bay routes 6, and a plurality of guided vehicles 8 transfer articles along the routes 4 and 6. Along the routes 4 and 6 are load ports 10 and buffers 12. Each of the load ports 10 is a location where an article is delivered and received between a processing device (not shown) and each of the guided vehicles 8. Each of the buffers 12 is a location where the guided vehicles 8 temporarily place an article. The routes 4 and 6 have areas in which exclusive control is required. For example, exclusive control is required in merging areas 14 of the routes. Here, exclusive control refers to control that reliably eliminates the simultaneous entry of a plurality of guided vehicles into a given position on the traveling route. The guided vehicles 8 travel under the control of the ground controller 20. The ground controller 20 may directly control the guided vehicles 8, or may control the guided vehicles 8 via a zone controller that may be provided between the ground controller and the guided vehicles 8.

Figure 2:
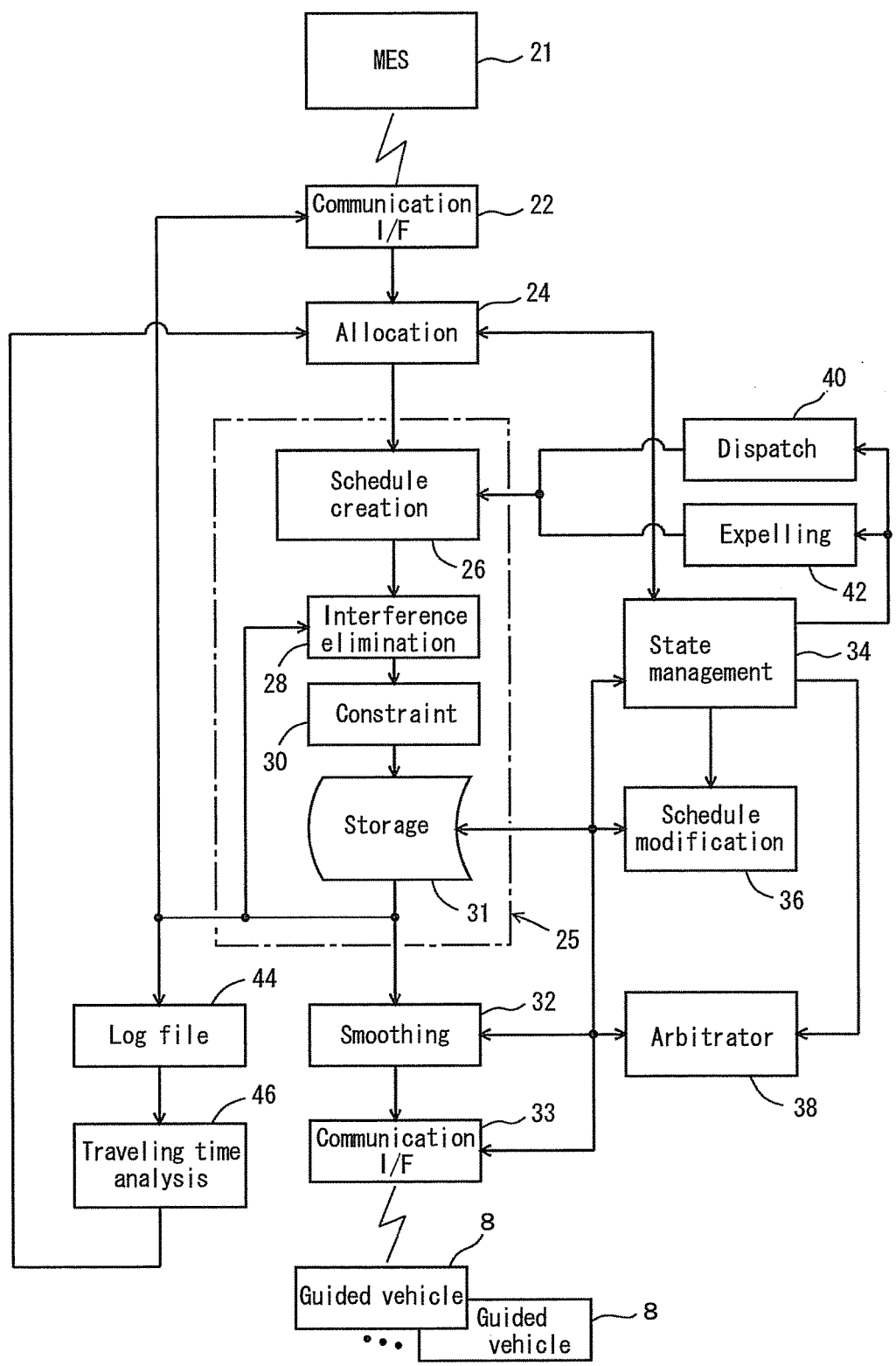
FIG. 2 is a block diagram of a ground controller according to the preferred embodiment.

FIG. 2 shows a configuration of the ground controller 20, in which a communication interface 22 receives a transport request from a superordinate controller such as an IVIES (Manufacturing Execution System) 21. The transport request specifies a load port where an article is picked up and a load port where an article is dropped off. In some cases, the transport request may specify the time at which pickup becomes possible and the time at which pickup should have been completed, as well as the time at which drop-off becomes possible and the time at which drop-off should have been completed. The influence of a pickup delay may be reduced using, for example, the buffers in the load port. However, a drop-off delay may result in stoppage of the processing device because there is no article to be processed. It is thus important that the guided vehicle arrives at the load port where an article is dropped off between the time at which drop-off becomes possible and the time at which drop-off should have been completed. An allocation unit 24 converts the transport request into a transport instruction, which is an instruction to each guided vehicle, and allocates the transport instruction to each guided vehicle via a communication interface 33, for example. The transport instruction may be transmitted to the guided vehicle 8 together with a traveling schedule, which will be described below, or only the transport instruction may be transmitted to the guided vehicle 8.

A schedule generation unit 25 generates a traveling schedule for each of the guided vehicles. The traveling schedule refers to a traveling schedule of a guided vehicle when the transport instruction, dispatch, expelling, or the like is executed. As used herein, a combination of the position on the traveling route at which the guided vehicle performs velocity control for acceleration or deceleration and the time at which that velocity control is performed is referred to as a "VCP (velocity control point)". Note that an area in which exclusive control is required, such as the merging area, is included in the velocity control points VCP, and the drop-off position and the pickup position are included in the VCPs because velocity change is involved. The traveling schedule includes a string of VCPs. A schedule creating unit 26 creates a traveling schedule from the current position of each guided vehicle to the destination (waiting position), disregarding interference with other guided vehicles. In principle, the destination is not the drop-off position, but a waiting position that is located farther than the drop-off position. When a guided vehicle waits after the completion of drop-off by traveling around, a traveling schedule until the start of traveling around is created by starting from the drop-off position, for example. When the time at which pickup becomes possible and the time at which pickup should have been completed, or the time at which drop-off becomes possible and the time at which drop-off should have been completed are specified in the transport instruction, a traveling schedule is created such that the guided vehicle arrives at the load port according to these times. When a traveling schedule according to these times cannot be created, this is reported to the MES 21 via the communication interface 22.

Since a plurality of guided vehicles 8 travel on the routes 4 and 6, there may be a situation in which interference between the guided vehicles 8 occur. An interference eliminating unit 28 modifies a traveling schedule that is newly created by the schedule creating unit 26 and a traveling schedule previously stored in a storage unit 31 so as to eliminate interference between the guided vehicles 8. In detecting interference, it is detected whether a guided vehicle interferes with either one of the guided vehicles traveling ahead of and behind that guided vehicle at each velocity control point VCP. For this purpose, for example, it is evaluated whether an inter-vehicle distance greater than or equal to a distance that is defined, for example, by the vehicle body length of the guided vehicle 8 exists between front and rear guided vehicles. Interference occurs between a front (downstream) guided vehicle and a rear (upstream) guided vehicle. Upon detection of interference, the traveling schedule of the rear guided vehicle is modified. The detection of interference need not be carried out for all positions on the traveling route that are defined by the traveling schedule, and it is sufficient that it is detected whether a guided vehicle interferes with the guided vehicles traveling ahead of and behind that guided vehicle at the velocity control points VCPs. Thus, for example, the distance or the time between VCPs is shortened so as to prevent the rear guided vehicle from passing the front guided vehicle between the VCPs. Alternatively, at the time of evaluating the presence or absence of interference at a VCP, it is evaluated whether or not the order of guided vehicles has changed between a VCP and the immediately preceding VCP. Additionally, for the traveling schedules of a plurality of guided vehicles, the velocity control points VCP are sequentially retrieved from the chronologically older ones to more recent ones, and the presence or absence of interference is sequentially detected starting from the older VCPs.

Upon detection of interference, a velocity control point for deceleration and a velocity control point for the subsequent re-acceleration are added for the rear guided vehicle, thereby avoiding interference. By chronologically sorting the velocity control points for a plurality of guided vehicles, detecting the presence or absence of interference, and modifying the traveling schedules, interference may be eliminated by performing a single detection of the presence or absence of interference for each velocity control point VCP. A constraint checking unit 30 checks whether a constraint such as a maximum value of power consumption is satisfied, and, if the constraint is not satisfied, modifies the traveling schedule. Each guided vehicle 8 is supplied with power by non-contact feeding via wiring on the ground, and a maximum power consumption is set for each power feeding area, which serves as a unit of range for which feeding is performed. When many guided vehicles accelerate simultaneously, the maximum power consumption may exceed its limit. Thus, the traveling schedules are modified such that the constraint of non-contact feeding will not be unsatisfied as a result of many guided vehicles accelerating simultaneously in the same power feeding area. Note that the constraint checking unit 30 may not be provided.

The storage unit 31 stores the traveling schedule from which interference has been eliminated and that has been modified so as to satisfy the constraint. Assuming that, for example, 100 guided vehicles 8 are provided and it takes several minutes to perform a single transport, then a traveling schedule is newly created and is completed, for about 100 guided vehicles per minute. Accordingly, the processing at the interference eliminating unit 28 and the constraint checking unit 30 is periodically performed at a predetermined time interval of, for example, about 1 to 30 seconds. The elimination of interference and the checking of the constraint are performed at this time interval for a traveling schedule stored in the storage unit 31 and a newly created traveling schedule, and the modified traveling schedules are stored in the storage unit 31.

In a traveling schedule composed of a string of velocity control points VCPs, the rates of acceleration of the guided vehicles change discontinuously. Therefore, the velocity is smoothed in the neighborhood of the velocity control points VCPs such that the rates of acceleration satisfy a predetermined condition. This processing is performed by a smoothing unit 32, but it may be performed by the guided vehicle 8. The communication interface 33 transmits a smoothed traveling schedule (velocity pattern) to the guided vehicle 8. Since the schedule creating unit 26 creates a traveling schedule up to the waiting position beyond the drop-off position, it creates a schedule for over several minutes, for example, for the guided vehicle. On the other hand, the traveling schedule is modified at a cycle of about 1 to 30 seconds. Accordingly, the communication interface 33 transmits, to each guided vehicle 8, for example, a traveling schedule or a velocity pattern until the time at which the traveling schedule is modified next such that the traveling schedule that has been already received by the guided vehicle will not be wasted.

Each guided vehicle 8 reports, to the communication interface 33, the position and time, the velocity and state, and events such as pickup, drop-off, and a request for passing through the merging areas. The state of the guided vehicle 8 is stored and managed in a state managing unit 34. A schedule modifying unit 36 compares the actual state of the guided vehicle 8 that is stored in the state managing unit 34 with the traveling schedule stored in the storage unit 31. If there is a deviation greater than or equal to a permissible value, the schedule modifying unit 36 modifies the traveling schedule in the storage unit 31 so as to be shifted by the time corresponding to the amount of deviation, for example. This modification is used when interference between traveling schedules is evaluated next. The traveling schedule may be modified each time the state of a guided vehicle is received, regardless of the presence or absence of deviation.

It can be considered that exclusive control carried out in the merging area or the like is included in the traveling schedule. When it is guaranteed that each guided vehicle hardly deviates from its traveling schedule, exclusive control may be achieved by the guided vehicle traveling according to the traveling schedule. However, when there is the possibility that the order of arrival at the merging area or the like may be deviated from the order assumed in the traveling schedule, an arbitrator 38 is provided in order to separately perform exclusive control. For example, a request to pass through an exclusive control area such as the merging area is issued from the guided vehicle 8 to the arbitrator 38, and exclusive control is performed by the arbitrator 38. Alternatively, instead of issuing a request to pass through the exclusive control area from the guided vehicle 8, the arbitrator 38 may obtain the actual position and velocity of the guided vehicle from the data in the state managing unit 34 so as to determine the order of passage through the exclusive control area, and may give an instruction to the guided vehicle 8 accordingly.

A dispatch unit 40 instructs, for example, an empty guided vehicle, or in other words, a guided vehicle to which a transport instruction is not allocated, to move to a designated position along the routes 4 and 6. This means that a guided vehicle is moved from an area in which there are sufficient empty guided vehicles to an area in which there is a shortage of empty guided vehicles. In the preferred embodiment, a guided vehicle that has not been instructed to travel, or in other words, a guided vehicle to which a transport instruction or a dispatch instruction is not allocated and that is not traveling even for maintenance or any other reasons, is at a stop at the waiting position. The waiting position is a designated position on the intra-bay route 6, for example.

A guided vehicle that is at a stop at the waiting position may sometimes obstruct the travel of other guided vehicles. The state managing unit 34 manages a guided vehicle that is at a stop at the waiting position. An expelling unit 42 detects a guided vehicle that obstructs the travel of other guided vehicles, and gives an expelling instruction to that guided vehicle. The content of the expelling instruction is to travel to a designated position and wait at the designated position. The schedule creating unit 26 creates a traveling schedule for a guided vehicle that is to be dispatched or expelled, and the travel of that guided vehicle is controlled in the same manner as with a guided vehicle that is executing the transport instruction. Instead of providing the expelling unit 42, a guided vehicle at the waiting position may be handled, assuming that a traveling schedule in which the velocity is 0 has been created for that guided vehicle. Instead of being at a stop at the waiting position, the guided vehicle 8 may travel around along the routes 4 and 6.

A log file storage unit 44 stores a traveling schedule that has been completed. A traveling time analyzing unit 46 obtains a parameter for calculating the required traveling time from the past traveling schedules. The traveling schedules in the storage unit 31 provide estimated times at which the guided vehicle arrives at the pickup position and the drop-off position. Accordingly, in response to, for example, a request from the MES 21, the estimated times at which the guided vehicle arrives at the pickup position and the drop-off position are output to the MES 21 via the communication interface 22.

Figure 3:
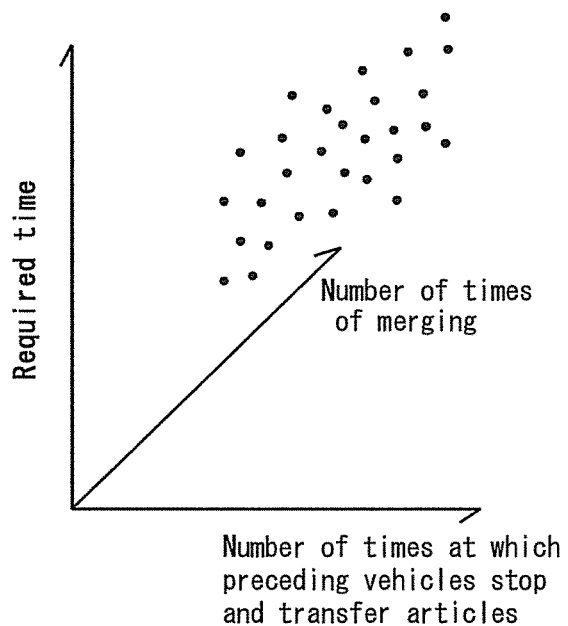
FIG. 3 is a graph showing a calculation model for a required time according to the preferred embodiment.

FIG. 3 illustrates the estimation of the required traveling time. From among the data in the log file storage unit 44, the past traveling schedules in which the guided vehicle traveled such that the starting point and the destination of traveling are included are retrieved. The starting point refers to, for example, the current position of a guided vehicle at the time of allocating a transport instruction to the guided vehicle, and the destination refers to, for example, the waiting position. The actual required time between the starting point and the destination is obtained from the retrieved traveling schedule. Additionally, the number of times (stoppage/transfer count) at which the preceding guided vehicle stops and transfers an article between the starting point and the destination is obtained from the preceding traveling schedule, and the number of merging areas between the starting point and the destination is obtained from a map of the traveling route. Then, the required traveling time T is statistically processed using the stoppage/transfer count "n" and the number of merging areas "m" as explanatory variables. For example, it is approximated that T=an+bm+c, and the values of coefficients "a", "b", and "c" are obtained. Here, the constant term "c" represents the standard required time, "a" represents the expected value of an increase in required time by a single stoppage/transfer, "b" represents the expected value of an increase in required time by a single merging area. The values of "a", "b", and "c" are stored, for example, for each combination of a starting point and a destination, and the required traveling time is obtained from the stoppage/transfer count and the number of merging areas of the preceding guided vehicle. The obtained required traveling time is the required time used at the time of creating a traveling schedule by the schedule creating unit 26. In general, the time during which the traveling route is blocked by stoppage/transfer is longer than the waiting time for passage through the merging area. Thus, it may be approximated that T=an+c, and the number of times of passage through the merging areas may be ignored.

Figure 4:
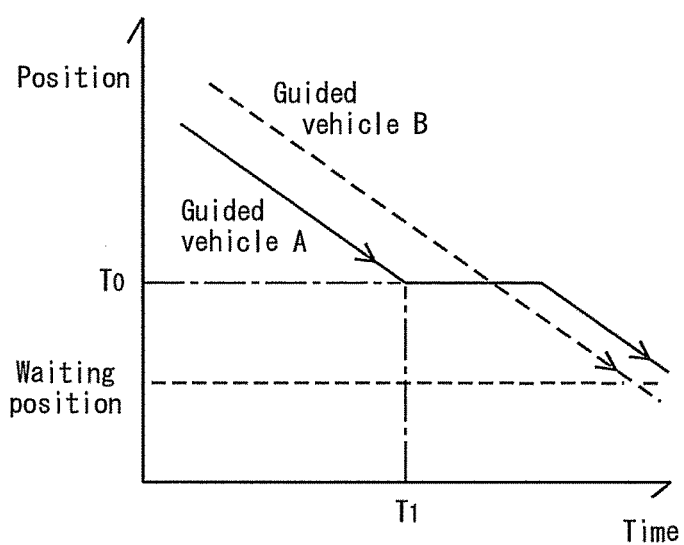
FIG. 4 illustrates the significance of creating a traveling schedule to a waiting position according to the preferred embodiment.
Figure 5:
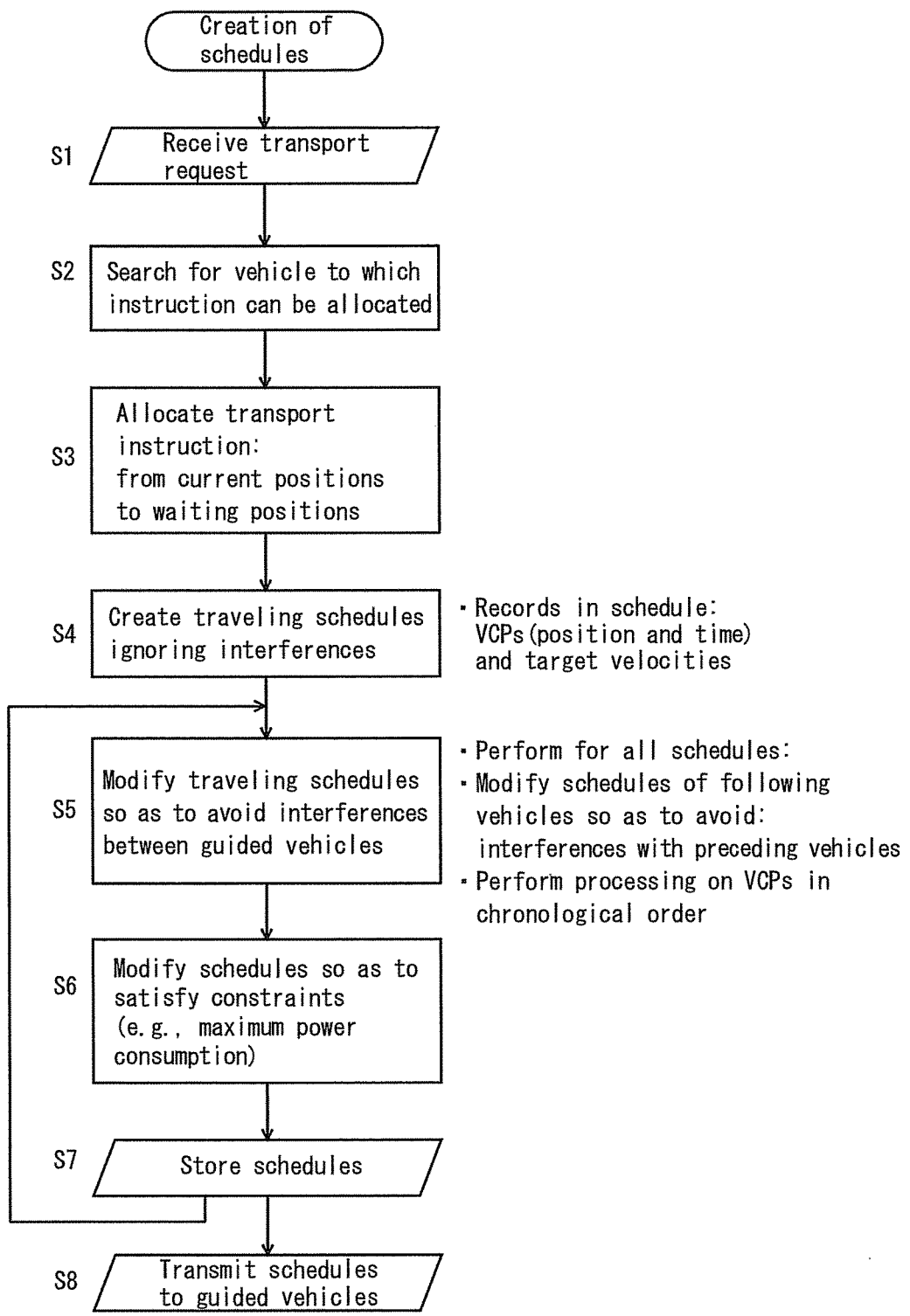
FIG. 5 is a flowchart illustrating an algorithm for creating a traveling schedule of a guided vehicle according to the preferred embodiment.

FIG. 4 illustrates the significance of creating a traveling schedule up to the waiting position, which is farther than the To position. It is assumed that in a traveling schedule in which a preceding guided vehicle A arrives at the To position at time T1, a guided vehicle B travels behind the guided vehicle A. The preceding guided vehicle A stops at the To position to transfer an article, and further travels to the waiting position. Here, if the traveling schedule is available only up to the To position, it is difficult to create a reliable traveling schedule for the guided vehicle B. By creating the traveling schedule of the guided vehicle A up to the waiting position, it is possible to create a traveling schedule for the guided vehicle B such that the guided vehicle B decelerates before the To position. Additionally, the expelling unit 42 detects that the guided vehicle A needs to be expelled from the waiting position for the guided vehicle B. The schedule generation unit 25 creates a traveling schedule for the guided vehicle A from the waiting position to a position at which the guided vehicle A does not obstruct the guided vehicle B, and gives an instruction to the guided vehicle A accordingly.

FIGS. 5 to 9 illustrate the processing performed by the schedule generation unit 25. When the communication interface 22 receives transport request from the MES 21 or the like in Step S1 in FIG. 5, the allocation unit 24 searches for a guided vehicle to which the transport instruction can be allocated, and allocates the transport instruction to the searched guided vehicle (Steps S2, S3). Here, the transport instruction is an instruction to travel from the current position via a load port for pick up and a load port for drop-off to the waiting position. The schedule creating unit 26 creates a traveling schedule in traveling for the guided vehicle to which the transport instruction is newly allocated, disregarding interference with other guided vehicles (Step S4). Hereinafter, the traveling schedule is simply referred to as a "schedule". A schedule is composed of velocity control points VCPs and records such as the next target velocity, and positions and times are included in the data of the velocity control points VCPs. Since the next target velocity is determined from the positional difference and the time difference between two VCPs, the target velocity may not be specified in the traveling schedule.

Figure 6:
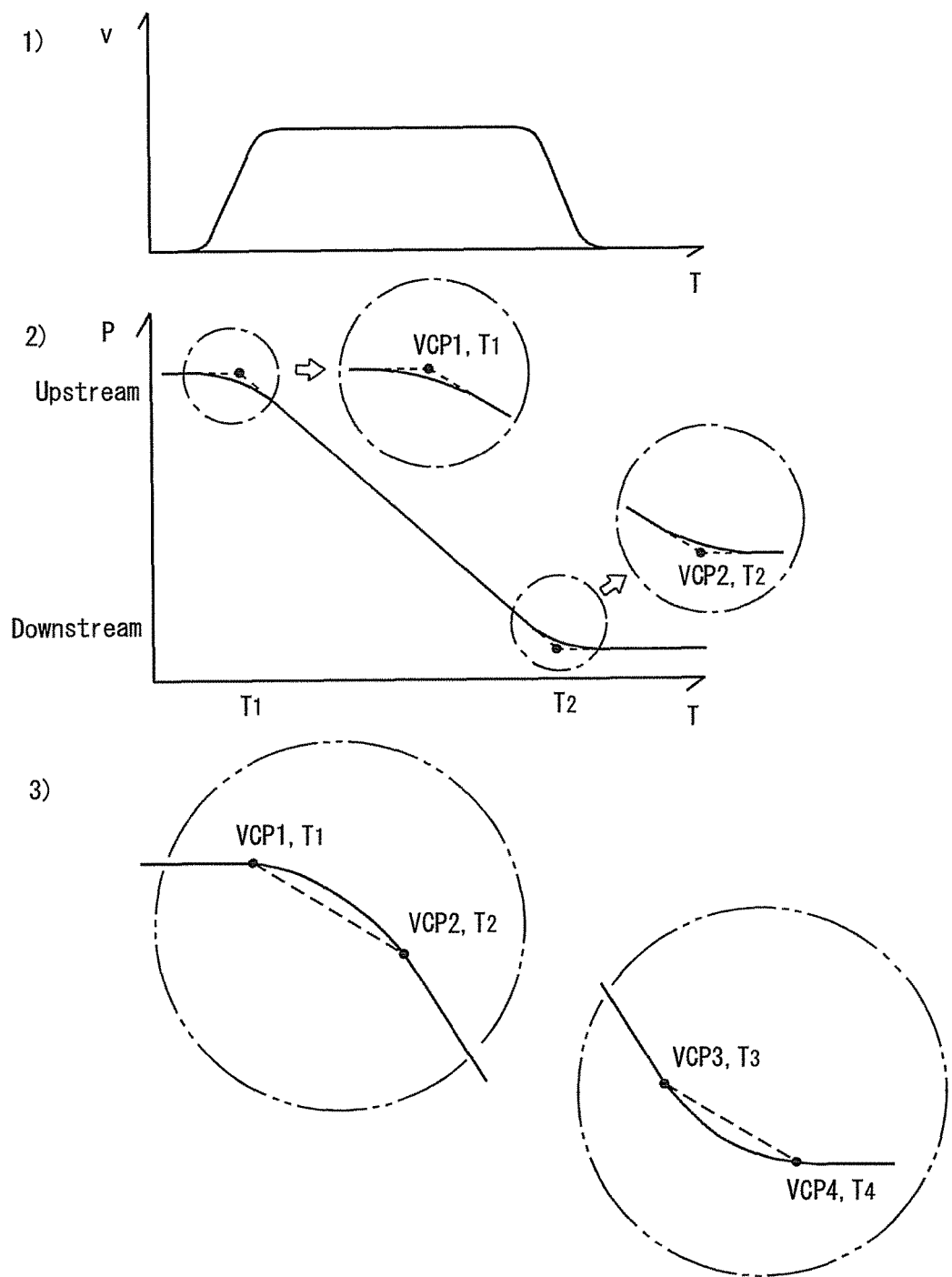
FIG. 6 illustrates the significance of VCPs (velocity control points) according to the preferred embodiment, with 1) showing a velocity pattern, 2) showing a traveling schedule in which the velocity pattern in 1) is represented by two VCPs, and 3) showing an example in which each of the VCPs in 2) is represented by two VCPs.

FIG. 6 illustrates the concept of the velocity control points VCPs. 1) of FIG. 6 shows a velocity pattern of a guided vehicle, and the velocity is specified as a function of time. When the velocity pattern shown in 1) of FIG. 6 is converted into positions on the traveling route as a function of time, a solid line as shown in 2) is given. The velocity pattern is constituted by repetitions of acceleration, constant velocity traveling, and deceleration. Therefore, the velocity pattern is simplified, and it is assumed that the velocity is rapidly changed as indicated by dashed lines as shown in 2) of FIG. 6. Velocity control points VCPs are the positions and the times at which the velocity is rapidly changed in this case. In 2), acceleration, constant velocity traveling, and deceleration are represented by two control points. A single acceleration or deceleration may be represented by two or more velocity control points VCPs. For example, when acceleration and deceleration are each represented by two velocity control points VCPs, they will be as shown in 3) of FIG. 6.

FIG. 7 shows an example of the traveling schedule before interference is eliminated therefrom. The records in the traveling schedule are the positions and the times of VCPs and the next target velocity. If any event such as pick up, merging, or drop-off is involved, such event is described in addition to these records. The event may be specified separately from the traveling schedule. For example, in the case of FIG. 7, seven VCPs are specified, and two of them represent pickup and drop-off and have a target velocity of 0. When a traveling schedule 70 as shown in FIG. 7 is represented as the positions and the times on the traveling route, they will be as shown in FIG. 8.

Referring back to FIG. 5, in Step S5, the traveling schedule is modified so as to avoid interference between the guided vehicles. This processing is executed on the traveling schedule stored in the storage unit 31 and the traveling schedule newly created by the schedule creating unit 26, for example, at a time interval of about 1 to 30 seconds. Then, the schedule of the following guided vehicle is modified so as to prevent interference with the preceding guided vehicle. The VCPs in a plurality of schedules are chronologically retrieved, and the processing is executed on the VCPs starting from the chronologically older ones to more recent ones.

FIG. 9 shows an example of the detection of interference and the modification of the traveling schedule. It is assumed that there are three traveling schedules, namely, the traveling schedule indicated by the chain line, the traveling schedule indicated by the solid line, and the traveling schedule indicated by the dashed line. When the VCPs are chronologically retrieved, the VCPs are in the order: times T1 to T6. Assuming now that the presence or absence of interference at the time T5 with respect to the traveling schedule indicated by the solid line is checked, there is a sufficient interval with the traveling schedule indicated by the chain line, and interference occurs with the traveling schedule indicated by the dashed line. Here, since the traveling schedule indicated by the dashed line is the schedule of the rear guided vehicle, the VCP at the time T6 of the traveling schedule indicated by the dashed line is changed to a VCP for deceleration, and a VCP (time T7) for re-acceleration is added subsequently. Since the rate of acceleration discontinuously changes at these VCPs, the velocity pattern of the guided vehicle is obtained by smoothing the rate of acceleration such that it falls within a permissible range.

In Step S6, the schedule is modified so as to satisfy a constraint such as a maximum power, and the modified schedule is stored in the storage unit 31. The schedule expires upon completion of the instruction, and a new schedule is generated as a result of a new allocation. Accordingly, the processing of Steps S5 to S7 is repeated for each period of about 1 to 30 seconds, or either regularly or irregularly so as to repeatedly perform the elimination of interference and the modification for satisfying the constraint. In Step S8, a traveling schedule obtained by performing smoothing, for example, on a traveling schedule of the next 1 to 30 seconds is transmitted to the guided vehicle.

Figure 10:
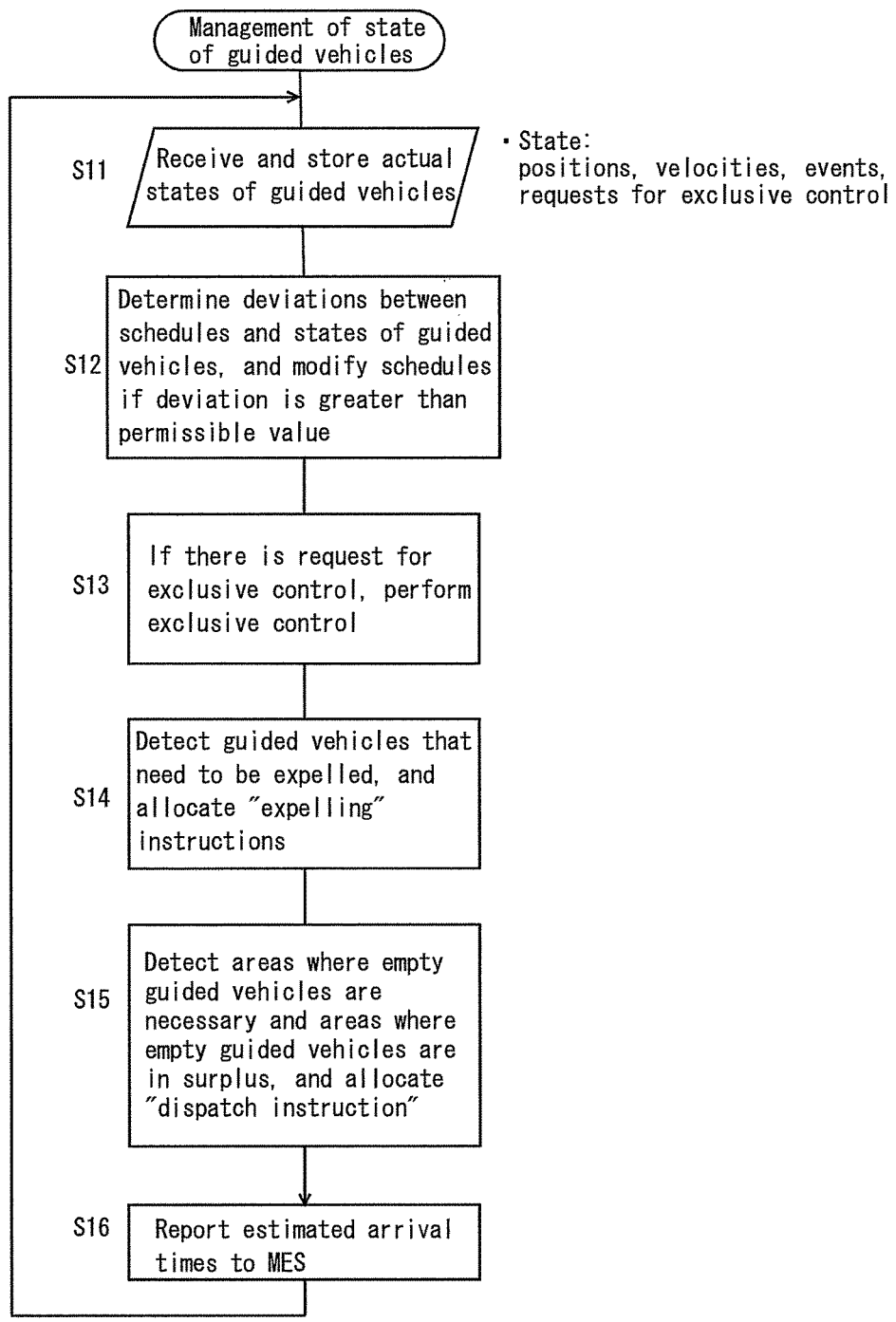
FIG. 10 is a flowchart illustrating an algorithm for managing a state of the guided vehicle according to the preferred embodiment.

The details of the processing other than the creation of the traveling schedule are shown in FIG. 10. In Step S11, states of the guided vehicles are received via the communication interface 33, and the states are stored in the state managing unit 34. The states includes positions and velocities, times, and events, and also includes requests for exclusive control if an arbitrator is provided. In Step S12, the deviations between the traveling schedules and the real states of the guided vehicles are determined. If deviation is greater than a permissible value, the data in the storage unit 31 is overwritten so as to modify the deviating traveling schedule. If there is a request for exclusive control, exclusive control is performed by the arbitrator (Step S13). Furthermore, a guided vehicle that needs to be expelled is detected from the position of the guided vehicles, and an expelling instruction is allocated to the guided vehicle by the expelling unit 42. Additionally, for example, an area where empty guided vehicles are necessary and an area where empty guided vehicles are in surplus are detected by the dispatch unit 40 based on the data in the state managing unit 34, and an empty guided vehicle is dispatched (Step S15). Furthermore, for example, in response to requests from the MES 21, estimated arrival times at the pickup positions or the drop-off positions are determined from the data in the state managing unit 34 or the storage unit 31, and the estimated arrival times are reported to the MES 21 (Step S16).

The above preferred embodiment has the following advantageous effects.

(1) Traveling schedules up to the waiting positions are created, instead of traveling schedules up to the drop-off positions. Accordingly, as shown in FIG. 4, the traveling schedule of the following guided vehicle may be created so as not to cause interference with the stoppage/transfer at the "To" position and the movement to the waiting positions.

(2) The traveling schedules are simplified as a string of velocity control points VCPs, and interferences between a guided vehicle and the guided vehicles traveling ahead of and behind that guided vehicle are detected using the VCPs. Furthermore, the VCPs are chronologically retrieved and processed for a plurality of traveling schedules, thus enabling the interferences to be easily detected.

(3) Since the traveling schedules are modified only for the following guided vehicles, there is no need to keep modifying traveling schedules in an infinite loop, for example.

(4) The traveling schedules defined by VCPs are smoothed, and the guided vehicles travel accordingly. Thus, the guided vehicles may travel smoothly with simple traveling schedules.

(5) Upon detection of interference, a VCP for deceleration and a VCP for the subsequent re-acceleration are added for the following guided vehicle, thus enabling the traveling schedules to be modified easily.

(6) The traveling schedules are repeatedly modified, for example, at a predetermined time interval. Accordingly, the traveling schedules may be managed under the conditions in which a new traveling schedule is constantly generated.

(7) The traveling schedules may be made closer to reality by modifying the stored traveling schedules based on the actual states of the guided vehicles.

(8) The need to change the transmitted traveling schedules may be eliminated or reduced by transmitting not the whole but only part of the generated traveling schedules that correspond to a predetermined time range to the guided vehicles.

(9) The required time necessary may be obtained with a good approximation by adding, to the standard traveling times from for the travelling starting points to destinations, the time corresponding to the number of times the preceding guided vehicles stop to transfer articles during the required time. By using the thus obtained required time as the initial data of the traveling schedule, appropriate traveling schedules may be obtained.

(10) A more appropriate required time may be obtained by adding the number of times of exclusive control such as the number of merging areas to pass through to the standard traveling time and the number times of transfer of an article.

(11) The times at which the guided vehicles arrive at the pickup positions and the drop-off positions may be estimated substantially accurately.

(12) The area in which exclusive control is performed, such as a merging area, is included in the velocity control points VCPs, and the degree of deviation from the traveling schedules is monitored. The need for exclusive control may be at least partly eliminated by performing exclusive control as specified in the traveling schedules when the degree of deviation is small, and instructing, for example, stoppage before the merging area from the ground controller 20 only when the degree of deviation is large.

LIST OF REFERENCE NUMERALS

2 Guided vehicle system
4 Inter-bay route
6 Intra-bay route
8 Guided vehicle
10 Load port
12 Buffer
14 Merging area
20 Ground controller
21 MES
22, 33 Communication interface
24 Allocating unit
25 Schedule generation unit
26 Schedule creating unit
28 Interference eliminating unit
30 Constraint checking unit
31 Storage unit
32 Smoothing unit
34 State managing unit
36 Schedule modifying unit
38 Arbitrator
40 Dispatch unit
42 Expelling unit
44 Log file storage unit
46 Traveling time analyzing unit
70 Traveling schedule

What is claimed is:

1. A guided vehicle system for transporting articles between load ports by a plurality of guided vehicles traveling with articles carried thereon along a predetermined traveling route, the system including:
 a guided vehicle system controller comprising:
 a first communication unit configured to receive transport requests by communicating with a superordinate controller;
 a second communication unit configured to communicate with the guided vehicles;
 a schedule creating unit configured to create, for each of the guided vehicles, traveling schedules, disregarding interferences with other guided vehicles, each of the traveling schedules comprising a string of velocity control points, wherein each of the velocity control points is a combination of a position on the traveling route at which a guided vehicle performs velocity control and a time at which that velocity control is performed, wherein the schedule creating unit is configured to create the traveling schedules from a current position of each of the guided vehicles to a destination;

an interference eliminating unit configured to, detect interferences between the guided vehicles, and modify the traveling schedules of the guided vehicles so as to eliminate the detected interferences, for both newly created traveling schedules and traveling schedules from which interferences have been previously eliminated;

a first storage unit configured to store the traveling schedules from which interferences have been eliminated; and a second storage unit configured to store at least positions of the guided vehicles based on data received by the second communication unit from the guided vehicles, the guided vehicle system controller being configured to give instructions to travel to the guided vehicles according to the traveling schedules from the second communication unit, and repeat the creation of the traveling schedules, the elimination of interferences by modifying the traveling schedules, the storage of the traveling schedules from which interferences have been eliminated in the first storage unit, and modification of the traveling schedules based on the data in the second storage unit.

2. The guided vehicle system according to claim 1, wherein the schedule creating unit creates the traveling schedules from current positions of the guided vehicles via positions at which the guided vehicles load articles to waiting positions where the guided vehicles wait after dropping off the articles.

3. The guided vehicle system according to claim 1, wherein the guided vehicle system controller is configured to report estimated arrival times of the guided vehicles based on the traveling schedules to the superordinate controller via the first communication unit.

4. The guided vehicle system according to claim 3, wherein the transport requests specify load ports where articles are picked up and load ports where articles are dropped off, as well as times at which drop-offs become possible and times at which the drop-offs should have been completed, and the schedule creating unit creates the traveling schedules such that the guided vehicles arrive at the load ports where the articles are dropped off between the times at which the drop-offs become possible and the times at which the drop-offs should have been completed.

5. The guided vehicle system according to claim 1, wherein the guided vehicle system controller further comprises a schedule modifying unit configured to compare actual states of the guided vehicles stored in the second storage unit with the traveling schedules stored in the first storage unit, and the traveling schedules in the first storage unit are modified if there is a deviation greater than a permissible value, and the modification of the traveling schedules based on data in the second storage unit is performed by the schedule modifying unit.

6. The guided vehicle system according to claim 1, wherein the guided vehicle system controller further comprises exclusive control areas provided along the traveling route, and an arbitrator configured to determine an order in which the guided vehicles pass through the exclusive control areas based on requests from the guided vehicles or the data in the second storage unit.

7. A guided vehicle control method for controlling a guided vehicle in a system for transporting articles between load ports by a plurality of guided vehicles traveling with articles carried thereon along a predetermined traveling route, the method comprising performing with a guided vehicle system controller:

a): a step for receiving transport requests from a superordinate controller;

b): a step for creating traveling schedules for the guided vehicles, disregarding interference with other guided vehicles, each of the traveling schedules comprising a string of velocity control points, wherein each of the velocity control points is a combination of a position on the traveling route at which a guided vehicle performs velocity control and a time at which that velocity control is performed, wherein the step for creating traveling schedules creates the traveling schedules from a current position of the guided vehicles to a destination;

c): a step for detecting interferences between the guided vehicles;

d): a step for modifying the traveling schedules of the guided vehicles so as to eliminate the detected interferences, for both newly created traveling schedules and traveling schedules from which interferences have been previously eliminated;

e): a step for storing the traveling schedules from which interferences have been eliminated;

f): a step for storing at least positions of the guided vehicles based on data received from the guided vehicles;

g): a step for modifying the traveling schedules based on the stored positions of the guided vehicles; and h): a step for giving instructions to travel to the guided vehicles according to the traveling schedules, the guided vehicle system controller being configured to execute the steps c) to g) a plurality of times for a traveling schedule during execution of the traveling schedule.

8. The guided vehicle control method according to claim 7, wherein the transport requests specify load ports where articles are picked up and load ports where articles are dropped off, as well as times at which drop-offs become possible and times at which the drop-offs should have been completed, and the guided vehicle system controller creates, in the step b, the traveling schedules such that the guided vehicles arrive at the load ports where articles are dropped off between the times at which the drop-offs become possible and the times at which drop-offs should have been completed.

* * * * *